Figure 1:
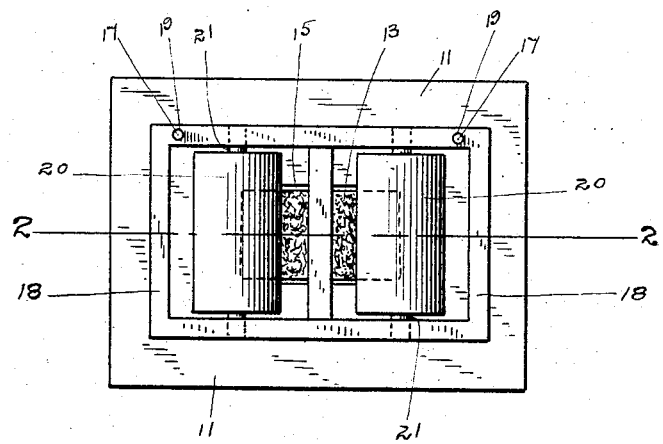

No. 771,888. PATENTED OCT. 11, 1904.
E. WARD.
ENVELOP MOISTENER.
APPLICATION FILED FEB. 17, 1904.

NO MODEL.

WITNESSES.
H. A. Lamb.
S. W. Atherton.

INVENTOR.
Edward Ward
By A. M. Wooster
Atty.

No. 771,888.

Patented October 11, 1904.

UNITED STATES PATENT OFFICE.

EDWARD WARD, OF SHELTON, CONNECTICUT, ASSIGNOR OF ONE-HALF TO HARRY CROWTHER, OF SHELTON, CONNECTICUT.

ENVELOP-MOISTENER.

SPECIFICATION forming part of Letters Patent No. 771,888, dated October 11, 1904.

Application filed February 17, 1904. Serial No. 193,963. (No model.)

*To all whom it may concern:*

Be it known that I, EDWARD WARD, a citizen of the United States, residing at Shelton, county of Fairfield, State of Connecticut, have invented a new and useful Envelop-Moistener, of which the following is a specification.

My invention has for its object to provide a simple and inexpensive moistener for the flaps of envelops which will operate equally well on large or small envelops, will occupy but little room, will be adapted for general use, as upon desks, and which may be moved about freely without the slightest danger of spilling water.

With these and other objects in view I have devised the simple and novel envelop-moistener of which the following description, in connection with the accompanying drawings, is a specification, reference characters being used to indicate the several parts—

Figure 2:
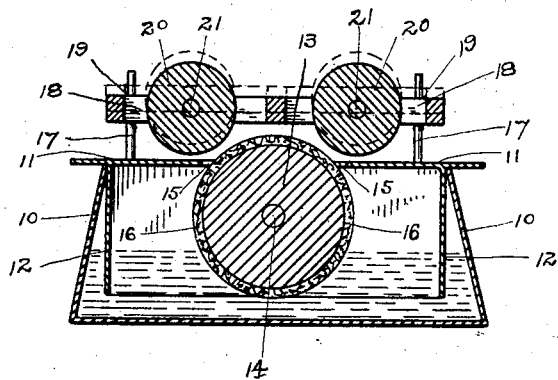

Figure 1 is a plan view of the device as in use, and Fig. 2 is a vertical section on the line 2 2 in Fig. 1.

10 indicates a tank or water-holder which is open at the top and may be made of metal, brass, or porcelain and of any required shape or size. I preferably make the tank rectangular in form and with upwardly-converging sides and ends, as indicated in the drawings. This construction is not an essential feature, but is preferably adopted in order to assist in preventing escape of water from the tank when the moistener is moved about and renders it unnecessary to use any special care in moving it.

The operative parts of the device are carried by a lid or cover 11, which is provided with a depending flange 12, which closely fits the opening in the top of the tank and extends down to within a short distance of the bottom thereof.

13 denotes the moistening-roller, which is mounted to turn freely on a cross-pin 14, the ends of which engage opposite sides of the depending flange. The lower portion of the moistening-roller is immersed in the water in the tank, the upper portion thereof projecting through an opening 15 in the lid. In practice moistening-roller 13 is covered with absorbent material, as felt, wicking, or any substance that will take up and hold water, the covering of the roller being indicated by 16.

17 denotes pins extending upward from the top of the lid, and 18 a frame having openings 19, through which the pins pass loosely, so as to permit the frame to rise and fall freely on the pins.

20 denotes pressure-rollers mounted to turn freely on cross-pins 21 in the frame. These rollers remain just out of contact with the moistening-roller, so as not to become moistened thereby, but are placed relatively close thereto, so as to hold the flap of an envelop close down upon the moistening-roller in use. It should be understood that while vertical movement of the front of the frame carrying the operating-rollers is essential vertical movement on the pins is not essential. For example, instead of sliding vertically on the pins the frame may be hinged to one or more pins or standards extending from the lid, so as to swing in the vertical plane. This variation in construction being such an obvious mechanical expedient is not thought to require illustration in the drawings.

In use the operator opens out the flaps of envelops to be sealed and passes them quickly under the dry rollers and over the moistening-roller, so that the inner or gummed flap of the envelop is thoroughly moistened without moistening the outer side of the flap. The flap is then turned down to place and sealed by pressure in the usual way.

Having thus described my invention, I claim—

1. In a device of the character described the combination with a tank open at the top, of a lid having a depending flange adapted to fit the opening in the tank and having an opening, a moistening-roller carried by the flange which projects through the opening in the lid and is adapted to be partly immersed in water in the tank, a vertically-movable frame mounted on said lid and pressure-rollers carried thereby and lying out of contact with the moistening-roller, between which and the moistening-roller the flaps of envelops are passed in use.

2. In a device of the character described the combination with a tank having an opening and upwardly-converging sides, of a lid having a depending flange adapted to fit said opening, a moistening-roller carried by said flange, a frame and pressure-rollers mounted on the lid between which and the moistening-roller the flaps of envelops are passed in use.

3. In a device of the character described the combination with a tank open at the top, of a lid having a depending flange adapted to fit the opening in the tank and provided with an opening, a moistening-roller covered with absorbent material which projects through the opening in the lid and is adapted to be partly immersed in water in the tank, and a vertically-movable frame and pressure-rollers mounted on the lid between which and the moistening-roller the flaps of envelops are passed in use.

4. In a device of the character described the combination with a tank open at the top, of a lid having a depending flange adapted to fit the opening in the tank and having an opening, a moistening-roller carried by the flange and projecting through the opening in the lid, pins extending upward from the lid, a frame having openings through which the pins pass loosely so that the frame will slide freely thereon, and rollers carried by said frame between which and the moistening-roller the flaps of envelops are passed in use.

5. In a device of the character described the combination with a tank, a lid and a moistening-roller carried thereby, of a vertically-movable frame mounted on said lid and pressure-rollers carried thereby between which and the moistening-roller the flaps of envelops are passed in use.

6. In a device of the character described the combination with a tank, a lid therefor and a vertically-movable frame, of a moistening-roller carried by the lid and vertically-movable pressure-rollers carried by the frame and lying on opposite sides of the moistening-roller between which and the pressure-rollers the flaps of envelops are passed in use.

In testimony whereof I affix my signature in presence of two witnesses.

EDWARD WARD.

Witnesses:
  H. W. VAUGHN,
  J. H. HARTWELL.